(12) United States Patent
Stolarczyk et al.

(10) Patent No.: US 6,473,025 B2
(45) Date of Patent: Oct. 29, 2002

(54) LANDMINE LOCATING SYSTEM

(75) Inventors: Gerald L. Stolarczyk; Larry G. Stolarczyk, both of Raton, NM (US)

(73) Assignee: Stolar Horizon, Raton, NM (US)

( * ) Notice: Subject to any disclaimer, the term of this patent is extended or adjusted under 35 U.S.C. 154(b) by 0 days.

(21) Appl. No.: 10/046,840

(22) Filed: Jan. 15, 2002

(65) Prior Publication Data

US 2002/0140596 A1 Oct. 3, 2002

Related U.S. Application Data

(63) Continuation-in-part of application No. 09/820,498, filed on Mar. 28, 2001.

(51) Int. Cl.$^7$ .......................... G01S 13/88; G01S 13/00
(52) U.S. Cl. .......................... 342/22; 342/27; 342/175; 342/194; 342/195; 342/357.01; 342/357.06; 102/401; 102/402
(58) Field of Search .................. 342/22, 27, 28, 342/52–58, 175–186, 195, 357.01–357.17, 68, 82, 89, 90, 118, 194; 701/200, 207, 213, 214, 215, 216, 218, 219–224, 300; 102/401, 402, 403; 367/87, 93, 94; 89/1.11, 1.13; 324/326–329, 332, 344, 345; 376/154, 159; 700/90, 245, 258; 340/850, 851, 852

(56) References Cited

U.S. PATENT DOCUMENTS

| | | | | | |
|---|---|---|---|---|---|
| 5,307,272 | A | * | 4/1994 | Butler et al. | 700/90 |
| 5,489,909 | A | * | 2/1996 | Dittmann et al. | 342/68 |
| 5,592,170 | A | * | 1/1997 | Price et al. | 342/22 |
| 5,598,152 | A | * | 1/1997 | Scarzello et al. | 340/850 |
| 5,680,048 | A | * | 10/1997 | Wollny | 324/329 |
| 5,942,899 | A | * | 8/1999 | Shrenkenhamer et al. | 324/326 |
| 6,026,135 | A | * | 2/2000 | McFee et al. | 376/159 |
| 6,222,481 | B1 | * | 4/2001 | Abrahamson et al. | 342/90 |
| 6,343,534 | B1 | * | 2/2002 | Khanna et al. | 89/1.13 |
| 6,377,872 | B1 | * | 4/2002 | Struckman | 700/258 |

FOREIGN PATENT DOCUMENTS

| | | | | | |
|---|---|---|---|---|---|
| EP | 1058132 | A1 | * | 12/2000 | G01V/3/38 |
| FR | 2479989 | A | * | 10/1981 | G01S/13/34 |

* cited by examiner

Primary Examiner—Bernarr E. Gregory
(74) Attorney, Agent, or Firm—Richard B. Main

(57) ABSTRACT

A landmine detection system comprises a ground-penetrating radar for probing the surface of the ground for landmines and other anomalies. The radar is swept back and forth across a lane while a user proceeds forward. A navigation sensor and processor keep track of all the parts of the lane that have been probed. A user display presents a visual graphic that represents the lane and the parts of it that have been probed. The user is then able to swing the radar to areas that are indicated as having been skipped in previous passes, e.g., to get 100%. coverage.

14 Claims, 3 Drawing Sheets

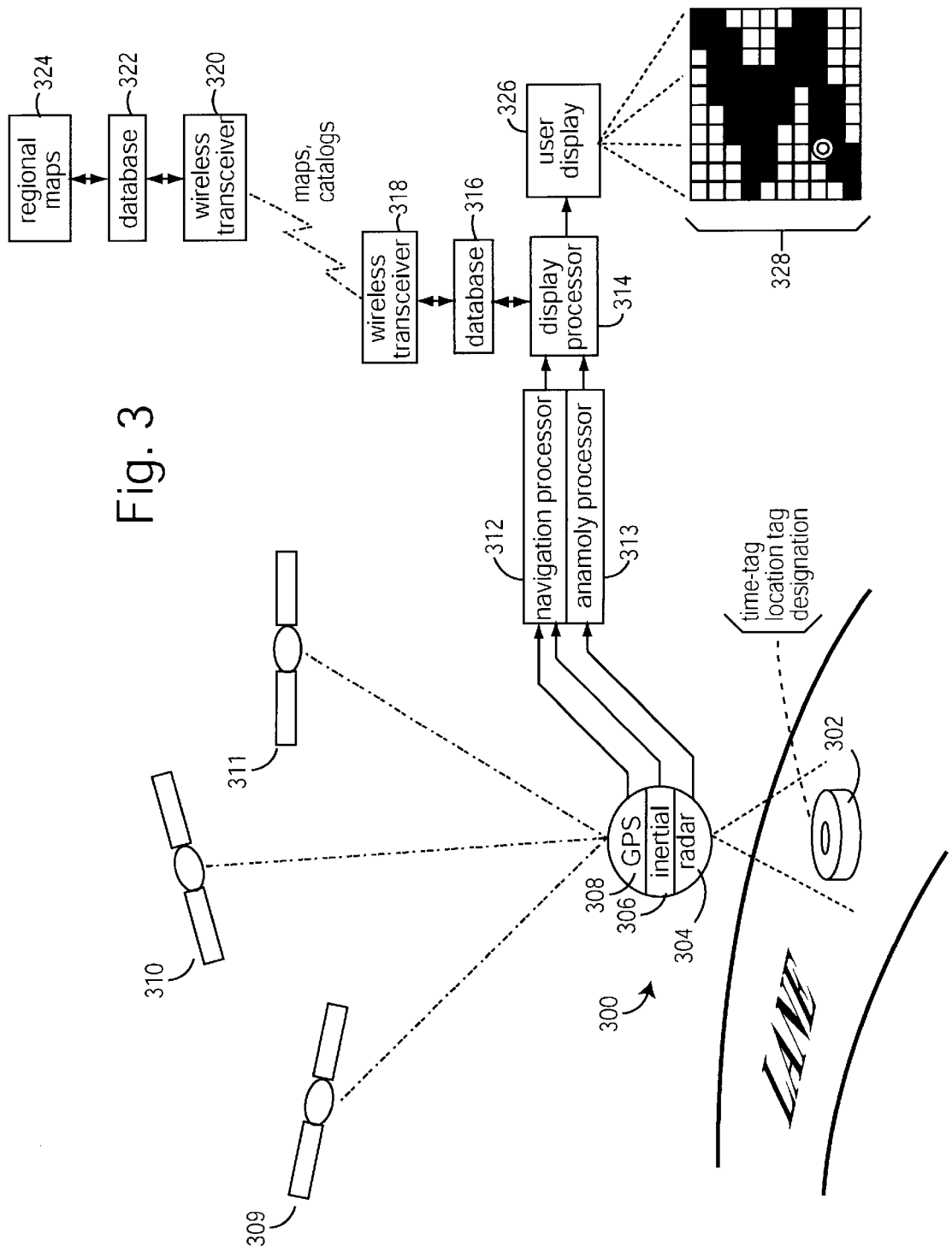

LANDMINE LOCATING SYSTEM

RELATED APPLICATION

This patent application is a continuation-in-part (CIP) of U.S. patent application Ser. No. 09/820,498, filed Mar. 28, 2001 and incorporated herein by reference.

BACKGROUND OF THE INVENTION

1. Field of the Invention

The invention relates generally to non-invasive methods and systems for probing the earth, and more specifically to radars that can image and detect landmines and other similar anomalies in the ground. And in particular, such landmine detection systems in which the users are guided by navigation devices.

2. Description of the Prior Art

Many valuable and/or dangerous objects are buried in the ground, and digging them up to see what is there is often not possible or practical. A number of different physical phenomena have been used as the basis of various kinds of non-invasive probes, e.g., electromagnetic, radar, and neutron-gamma signature. Metal detectors are commonly used by treasure hunters to find coins and other metal objects buried in the ground. Ground-penetrating radars have been developed as another way to "see" what is underground without damaging or setting-off the buried objects. Such radars have been very useful in locating certain types of anti-personnel and anti-tank landmines.

Michael D. Bashforth, et al., describe a wide band stepped frequency ground penetrating radar in U.S. Pat. No. 5,499,029, issued Mar. 12, 1996. Such relates to attempts to increase the average signal power and to preserving phase information so digital signal processing can extract more information about objects in the soil. The radar transmitter steps in frequency from 100 MHz to 1,000 MHz, and data is taken at 2.0 MHz step intervals. Both in-phase and quadrature data are collected for over 900 samples. The received signals are combined with samples from the transmitter to detect any phase shifting that may have been caused by objects in the ground, e.g., landmines and waste containers.

The present inventors, Larry Stolarczyk and Gerald Stolarczyk, describe the measuring of the thickness of ground deposit layers with a microstrip antenna, in U.S. Pat. No. 5,072,172, issued Dec. 10, 1991. Interpolation tables are used to lookup the layer thickness values corresponding to antenna conductance and resonance measurements. Such resonant microstrip patch antenna (RMPA) and their resulting measurements are used to guide coal-seam drum-cutter equipment for more efficient mining of natural deposit ores. The RMPA driving-point impedance ($S_{11}$) changes significantly when a solid, gas, or liquid layer thickness overlying the RMPA varies.

The RMPA can be swept above a soil surface to find buried landmines, utilities, and other shallow-buried objects. These objects don't necessarily need to be made of metal to be found. What is needed is that the dielectric constants of the objects and the medias they are buried in must differ, e.g., for contrast.

U.S. Pat. No. 5,769,503, issued Jun. 23, 1998 to Stolarczyk, et al., describes mounting such RMPA on a rotating drum or arm of a coal, trona, or potash mining machine. A ground-penetrating-radar transmitting antenna and a receiving antenna can be mounted on a cutting drum to detect deeply buried objects and anomalous geology just ahead of the mining. A radar frequency downconverter is used so low-cost yet-accurate measurement electronics can be built. A first phase-locked loop (PLL) is operated at the resonant frequency of the patch antenna or at each sequentially stepped radar frequency. A second PLL is offset from the first PLL by an intermediate frequency (IF) and is called a tracking PLL. The measurement speed can be delayed by the sequential way in which the PLL's lock on to signals, so a solution to that delay is described.

Many unfortunate tragedies have resulted from mine fields that were supposedly "clear". The fault is not in the detectors themselves, but in the way they are used. A typical handheld-portable detector mounted on a mast is swung left and right while the user moves forward. This results in a Z-pattern with open folds at each extreme. If the forward progress is too fast, some parts of the lane may not be thoroughly probed. If these skipped parts conceal consequentially undetected landmines, a tragedy thereafter lies in wait.

SUMMARY OF THE PRESENT INVENTION

Briefly, a landmine detection system embodiment of the present invention comprises a ground-penetrating radar for probing the surface of the ground for landmines and other anomalies. The radar is swept back and forth across a lane while a user proceeds forward. A navigation sensor and processor keep track of all the parts of the lane that have been probed. A user display presents a visual graphic that represents the lane and the parts of it that have been probed. The user is then able to swing the radar to areas that are indicated as having been skipped in previous passes, e.g., to get 100% coverage.

An advantage of the present invention is that a ground-penetrating radar is provided that finds landmines and other objects buried in the ground.

A further advantage of the present invention is that a landmine detection system is provided that assists the user in obtaining 100% coverage of lanes through mine fields.

A still further advantage of the present invention is that a landmine detection system is provided that can coordinate and share its findings with its peers.

Another advantage of the present invention is a landmine detection system is provided that can indicate where to begin sweeping according to downloaded coordinates.

These and other objects and advantages of the present invention will no doubt become obvious to those of ordinary skill in the art after having read the following detailed description of the preferred embodiment which is illustrated in the various drawing figures.

IN THE DRAWINGS

FIG. 3 is a diagram of a landmine sweeping system embodiment of the present invention.

DETAILED DESCRIPTION OF THE PREFERRED EMBODIMENTS

Figure 1:
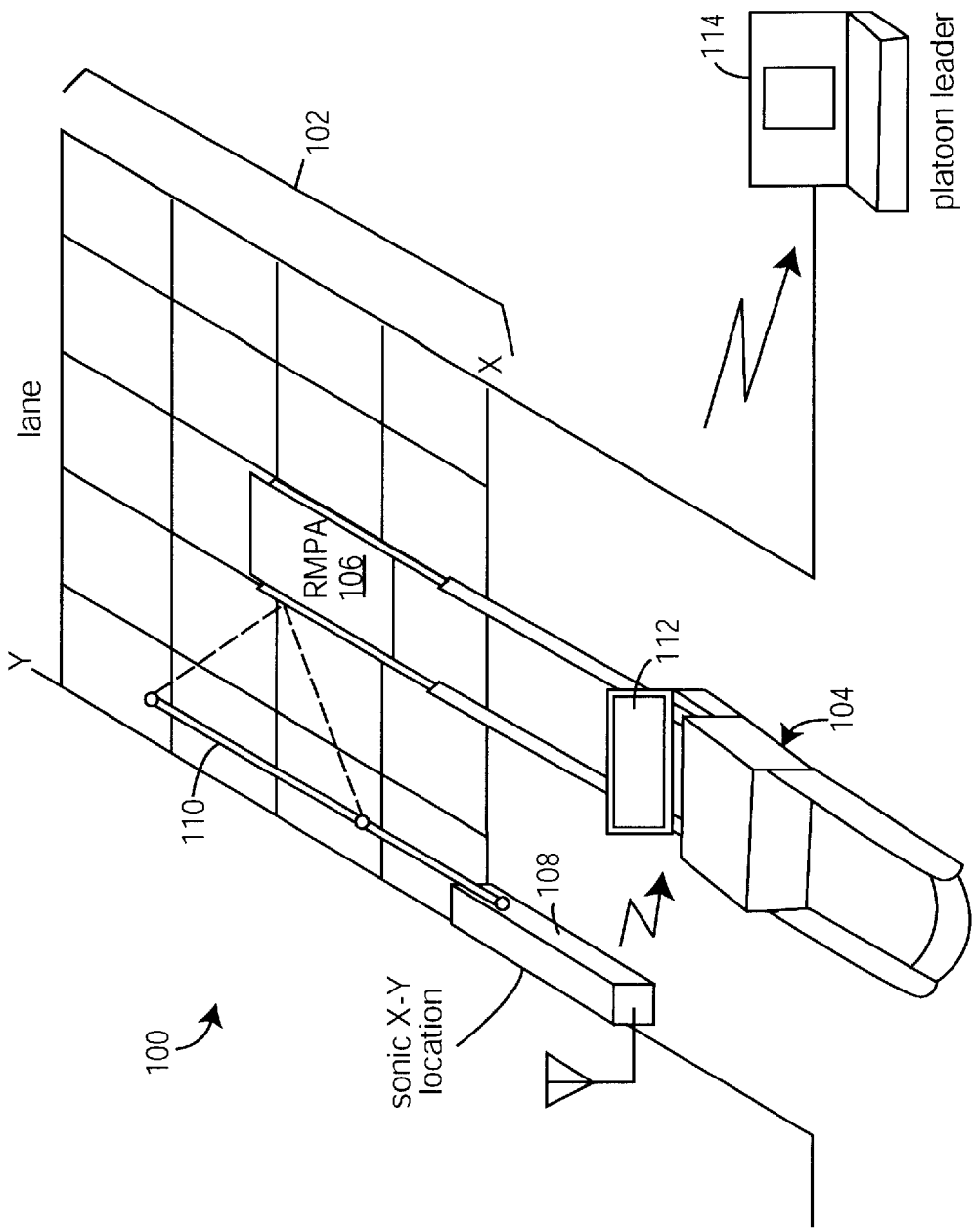
FIG. 1 is a diagram of a ground-penetrating radar system embodiment of the present invention.

FIG. 1 represents a landmine detecting system 100. An area of the ground 102 is systematically scanned by a ground-penetrating radar unit 104. A resonant microstrip patch antenna (RMPA) sensor 106 is moved in a search pattern over area 102. A sonic position-locating device 108 has a probe 110 that can determine where the RMPA sensor 106 is stationed. A display screen 112 presents a graphical user interface (GUI) which represents the area 102 and any buried objects in the area that have been detected and located. Such information is also preferably relayed to a platoon leader's console 114.

The RPMA sensor 106 is part of a ground-penetrating radar and is driven by a three-port directional coupler. A reflected-wave output port is buffered by a wideband isolation amplifier and a reflected-wave sample is analyzed to extract measured values of the real and imaginary parts of the load impedance, e.g., the driving point impedance of RMPA. Each such port will vary in a predictable way according to how deeply an object is buried in the soil. Calibration tables can be empirically derived. Reflections also occur at the interfaces of homogeneous layers of material in the soil. The reflected-wave signals are prevented from adversely affecting transmitted-signal sampling by putting another wideband isolation amplifier in front of the input port of the directional coupler. A suppressed-carrier version of the transmitted signal is mixed with the reflected-wave sample, and the carrier is removed. Several stages of filtering result in a DC output that corresponds to the values of the real and imaginary parts of the load impedance. The suppressed-carrier version of the transmitted signal is phase shifted 0° or 90° to select which part is to be measured at any one instant.

The landmine detecting system 100 is typically calibrated by vertically sweeping the RMPA antenna sensor head 106 up a foot above the soil and then back down to the soil surface while collecting a number of readings at known elevations. During operation, the RMPA sensor head 106 is horizontally scanned over the area 102. The whole of the measured I and Q values are graphically interpreted to represent buried objects on the graphics display 112. Such graphics data may also be radioed to a nearby computer command console 114.

The difference between the calibration value at a specific height is subtracted from the measurement value of impedance in real time. Such difference may be represented by a color or grayscale value on each pixel of the graphics display 112. The difference represents the landmine signal (S) to geologic noise (GN) ratio. The graphical display of the different impedance values can form a number of recognizable silhouette images of buried objects for expert identification.

The sonic position-locating device 108 is based on devices that measure the time-of-flight of soundwaves through the air. A couple of reference stations are positioned in the immediate area, and the position of the RMPA sensor 106 is triangulated between them. Such an arrangement may be impossible to deploy in some situations, or it may be too time-consuming and clumsy. In these instances, a fully self-contained landmine locating device is necessary.

Figure 2:
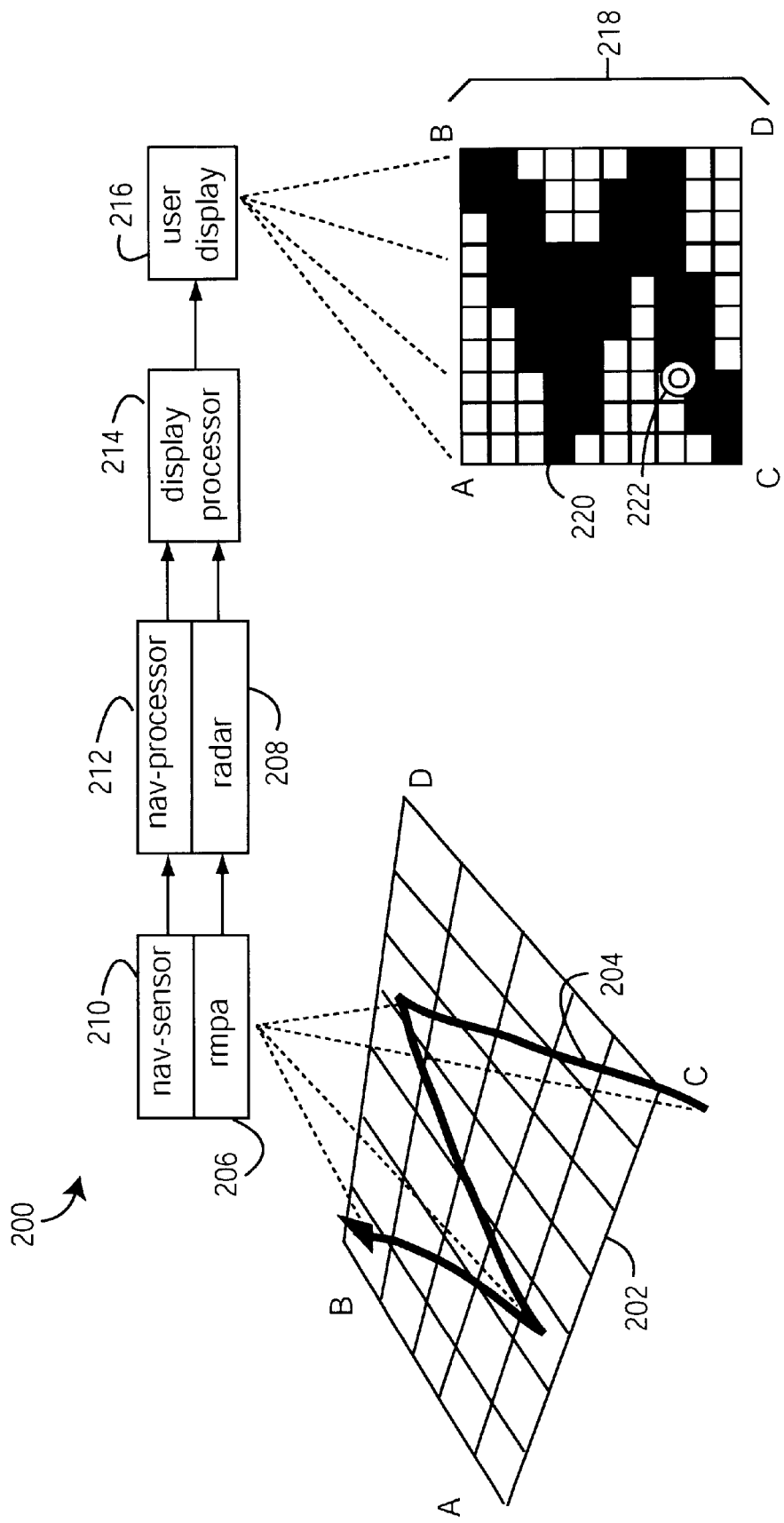
FIG. 2 is a diagram of a landmine locating system embodiment of the present invention.

FIG. 2 represents a landmine locating system embodiment of the present invention, and is referred to herein by the general reference numeral 200. The landmine locating system 200 is used to search a ground surface patch 202 for buried landmines. For example, such area can be an arbitrary one-meter square having imaginary corners labeled A-B-C-D. A sweep 204 begins by passing an RMPA sensor 206 back and forth over in a Z-pattern over patch 202. A radar 208 transmits radio signals through the RMPA sensor 206 into the soil of patch 202 and detects any return signals. The variations and quality of such return signals hint at the material makeup of the soil and any buried objects directly under the RMPA sensor 206. A navigation sensor 210 is attached to the RMPA sensor 206 to track its location changes over patch 202. A navigation processor 212 converts signals from the navigation sensor 210 into a series of position solutions that describe the actual course of track 204. A display processor 214 interprets the presence of buried landmines and suspicious objects from an output of radar 208, and tags them with the simultaneous position solutions obtained from navigation processor 212. A user display presents a graphic 218 on a screen.

A user can then be guided by the information presented in graphic 218 to resweep past points that were missed in the original track 204. In FIG. 2, the points that were actually visited in patch 202 are represented as blacked-out squares 220 in graphic 218. The user has only to sweep back and forth until all the squares of graphic 218 are blackened. A cursor 222 can be included in the display to help orient the user and guide the progress.

A reset or other pushbutton can be included to allow the user to signal the start of a sweep of a new patch 202 at any arbitrary starting point. Such initialization would be done by the display processor 214. The starting point can be represented as corner "C". The orientation and scope of the line C-D can be illicited from the first linear sweep of track 204.

Other methods can also be used to establish a reference point, grid orientation, and area size for patch 202. For example, it would be advantageous to adopt the reference points, orientation, and scale of printed or electronic map models in prior use by the users. To do this, the system 200 would have to be programmed with the information and its current location coordinates downloaded, e.g., with a keyboard. A global positioning system (GPS) receiver can be used for both manual and automatic position coordinate programming and downloading. A wireless uploading of graphic 218 and its coordinates to a central database would also be useful when a larger area or region was being simultaneously swept for landmines by a large company of users, and/or repetitively swept piecemeal by a few users over many hours and days. That way, maps of "cleared" areas could be electronically disseminated to people who need to immediately travel in the region.

In one embodiment of the present invention, the navigation sensor 210 comprises an X-Y accelerometer. The navigation processor 212 is then an inertial-navigation type. For example, a dual-axis acceleration sensor based on thermodynamics. Such a device is marketed by MicroElectro-Mechanical Systems & Integrated Circuit (MEMSIC) of Andover, Mass., as model MX202A. A bubble of heated gas, a thermal bubble, is induced over a semiconductor chip. Any movement of the bubble is interpreted as being due to velocity effects. Bandwidths of up to 160-Hz, and resolutions of one milli-gravity (mG) are typical. Other such devices by other manufacturers will probably also deliver acceptable performance.

In another embodiment of the present invention, the navigation sensor 210 comprises a GPS-receiver antenna. The navigation processor 212 is then a GPS receiver. In still further embodiments, inertial navigation and GPS receivers are combined so accurate position fixes are constantly available to the display processor 214. During times the GPS receiver loses signal, the inertial navigation can provide position-fix interpolations. The systematic drift suffered by inertial navigation techniques can be routinely and automatically canceled by the GPS receiver's position solutions.

FIG. 3 represents a landmine sweeping system embodiment of the present invention, and is referred to herein by the general reference numeral 300. The landmine sweeping system 300 can be used in a wide theater of operations in which thousands of landmines have been buried-and-forgotten over many square miles. In essence, many individual handheld portable detectors are randomly deployed over various parts of the region. As each detector sweeps a small part of the area, the exact lanes swept and the objects found are time-tagged, location-tagged, and cataloged into a theater-database. A patchwork compilation of all the information contributed by all the independent detectors is generated from a central point of operations and disseminated back out to people and vehicles that must travel in the mine fields.

For example, landmine sweeping system 300 is used to find buried landmines 302 in a lane or other path. A ground-penetrating radar 304 illuminates the lane with radio signals and detects any return signals. The signals returned will vary in strength and phase according to the material deposits within the lane. The contrasts and tomography will reveal silhouettes that can be identified. Alternatively, the radar 304 can be based on a neutron generator and gamma-ray detector. Explosives generally comprise large amounts of nitrogen fixed in various compounds, and nitrogen atoms will return a very distinctive gamma-ray signature when bombarded with neutrons. The neutron generator may be based on a deuterium-tritium (D-T) accelerator tube, or a longer-life but weaker emitting deuterium-deuterium (D-D) accelerator tube. Such generators are common in borehole logging, and other equipment. (E.g., as supplied by Activation Technology Corporation, Colorado Springs, Colo.)

The instantaneous location of radar 304 is tracked by an inertial-navigation sensor 306 and a navigation satellite receiving antenna 308. Such inertial-navigation sensor 306 preferably comprises a thermal bubble accelerometer, e.g., as supplied by MEMSIC. The navigation satellite receiving antenna 308 is preferably a Global Positioning System (GPS) type for receiving transmissions from a constellation of orbiting GPS-satellites 309–311. A navigation processor 312 uses these signals to compute the near-exact position of radar 304 and they further provide precise time information. An anomaly processor 313 generates a data item representing the landmine 302 and any designation or identification that was automatically determined or manually input. A display processor 314 combines information developed by the navigation and anomaly processors and generates video graphics. The time and position information is used to tag a data item representing landmine 302 in a database 316. A wireless radio 318 reports its findings through a central-operations wireless transceiver 320 to a central database 322. Regional maps 324 are input to and updated by the database 322. Such maps can be downloaded and annotated to the display processor 314 and a user display 326 to show a user where to start a sweep, and what particular spots need to be swept. A graphic 328 represents a user display that indicates the user's current position, the relative areas swept in black, and the areas to-be-swept by the user in white.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A landmine detecting and locating system, comprising:
    a ground-penetrating radar for emitting radio signals into the surface of the ground, and for receiving any returned signals;
    a navigation system attached to the ground-penetrating radar and providing for a series of position fixes that indicate ground locations visited by the ground-penetrating radar;
    a processor connected to the navigation system for mapping said ground locations visited onto a search grid, and connected to the ground-penetrating radar for evaluating said returned signals as indicating the presence of a buried a landmine; and
    a graphic display having a visual representation of said ground locations visited superimposed on a visual representation of said search grid, and providing for navigation guidance of a user to sweep the ground-penetrating radar across locations in said search grid that are not yet visited and evaluated for the presence of landmines.

2. The landmine detecting and locating system of claim 1, further comprising:
    an accelerometer sensor included in the navigation system that provides for inertial navigation solutions of said series of position fixes that indicate ground locations visited.

3. The landmine detecting and locating system of claim 2, wherein:
    the accelerometer sensor comprises a thermal bubble device that operates by sensing the movements of a heated bubble of gas on a semiconductor chip.

4. The landmine detecting and locating system of claim 1, further comprising:
    a navigation satellite antenna and receiver included in the navigation system that provides for navigation solutions of said series of position fixes that indicate ground locations visited.

5. A landmine sweeping system, comprising:
    a buried-object probe that electronically illuminates a lane on the ground and that interprets any signals received back for the presence of contrasting materials;
    a navigation sensor attached to the buried-object probe and providing for a series of navigation position fixes;
    a display processor connected to the buried-object probe and the navigation sensor, and providing for a data item that represents areas on a map that have been visited by the buried-object probe and scanned for buried objects; and
    a user display connected to translate said data item, and to visually depict said map and said buried objects on a video screen.

6. The landmine sweeping system of claim 5, further comprising:
    a rover database for storing many of said data items for later use in compilations that show the results of many sweeps for landmines.

7. The landmine sweeping system of claim 5, further comprising:
    a central database for storing maps and many of said data items for use in compilations that show the results of many sweeps for landmines.

8. The landmine sweeping system of claim 7, further comprising:
    a rover database for storing many of said data items for later use in compilations that show the results of many sweeps for landmines; and a wireless communication radio connected to share information in the central database with at least one rover database.

9. The landmine sweeping system of claim 5, further comprising:
a coordinate-downloading means from a remote location and providing for an initial search location to the display processor;
wherein, a user is guided to sweep an area determined to need investigation.

10. A method of landmine detection and logging, the method comprising the steps of:
manually sweeping a ground area for buried objects with a ground-penetrating radar;
computing a series of navigational positions visited by said ground-penetrating radar;
automatically marking a video map representation for user display to indicate the spots in a larger area that have been swept based on information obtained in the step of computing;
indicating on said video map representation any buried objects detected in the step of manually sweeping; and
showing a user on said video map representation any spots in said larger area that remain unswept and not investigated.

11. The method of claim 10, further comprising the step of:
visiting any locations indicated in the step of showing, and then repeating the steps of manually sweeping, computing, automatically marking, and indicating.

12. The method of claim 10, wherein the step of computing includes at least one of inertial navigation and satellite navigation receiver position solutions.

13. The method of claim 10, wherein the step of computing includes combining inertial navigation and satellite navigation receiver position solutions to obtain an uninterrupted series of location fixes of said ground-penetrating radar.

14. The method of claim 10, further comprising the step of:
automatically and electronically sharing a number of results obtained by independent rovers all repeating the steps of manually sweeping, computing, automatically marking, and indicating, in order to build a compilation and annotated map.

* * * * *